THERMOELECTRIC REFRIGERATING DEVICES

Filed Sept. 6, 1962

INVENTOR.
ALWIN B. NEWTON
BY
Sidney N. Rosenfeld
ATTORNEY

United States Patent Office 3,180,100

Patented Apr. 27, 1965

3,180,100

THERMOELECTRIC REFRIGERATING DEVICES

Alwin B. Newton, Spring Garden Township, York County, Pa., assignor to Borg-Warner Corporation, Chicago, Ill., a corporation of Illinois Filed Sept. 6, 1962, Ser. No. 221,794
1 Claim. (Cl. 62—3)

Figure 1:
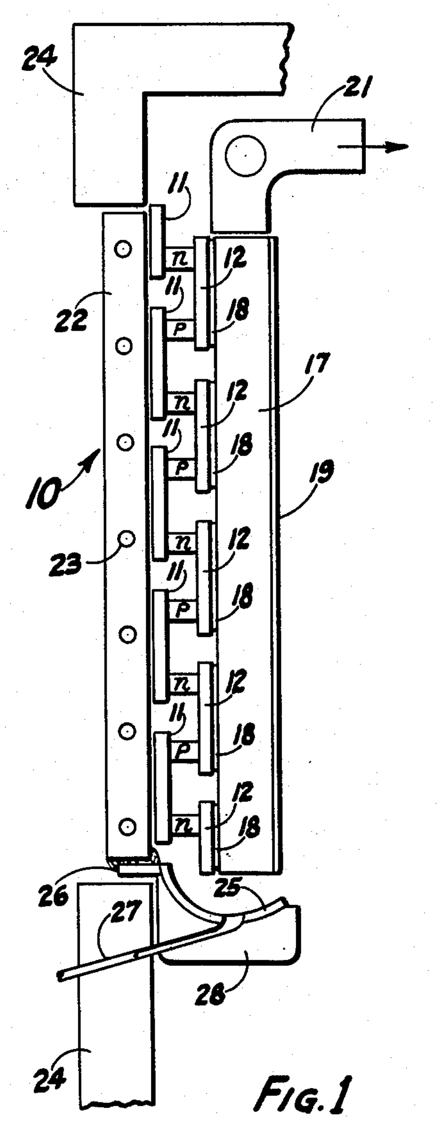

This invention relates to a thermoelectric conditioning device and, more particularly, to a construction useful in the removing of condensate from a thermoelectric refrigerating device.

With the advent of relatively efficient thermoelectric materials many thermoelectric conditioning systems have evolved. Typical of such devices are refrigerators whose interiors are in heat-exchange relationship with the heat abstracting portion of a thermoelectric module. The heat liberating side of the module is placed exteriorly of the compartment or space to be refrigerated. Many refinements of this basic idea are to be found in this art, for example, fins may be placed in heat-exchange relationship with the heat abstracting side of a thermoelectric module to effectively increase the surface area of this portion of the module. Further, a fan may be employed to circulate the fluid within the refrigerated space or enclosure to increase the heat-exchange relationship between the fluid and the heat abstracting side of the thermoelectric module.

In many applications, the fluid which is to be conditioned is air, and, as is well known to workers in the refrigeration art, the cooling of air which has moisture therein is often accompanied by condensation of the moisture from the air. A familiar example of this phenomenon is the accumulation of frost around the cooling compartment or fins of a household refrigerator, and the consequent necessity of periodic defrosting.

Because the condensate turns into frost and thus continually builds up, it is imperative that the refrigerator be periodically defrosted or some means be found for the removal of the condensate by converting it back to liquid form, thus precluding the continuous formation of frost. While it has been relatively simple to warm the fins to melt the frost, the resulting condensate usually falls into a pan which is at a temperature below freezing. Thus drainage of condensate from the pan is difficult or impossible without the addition of various separate heating devices to heat the pan.

Accordingly, it is an object of this invention to provide a refrigerator construction which facilitates the removal of condensate from the interior of a refrigerated atmosphere or space.

It is a further object of this invention to provide a refrigerator construction employing a thermoelectric module for cooling purposes with means to collect condensate and always retain it in the liquid form and convey it away from the interior of the refrigerator.

It is a further object of this invention to provide a refrigerator employing a thermoelectric assembly with a receptacle positioned immediately below the assembly, the receptacle including a thermally conducting substance and adapted to receive heat from the heat liberating side of the thermoelectric assembly.

These and other objects will be apparent from the following description of the invention.

Figure 2:
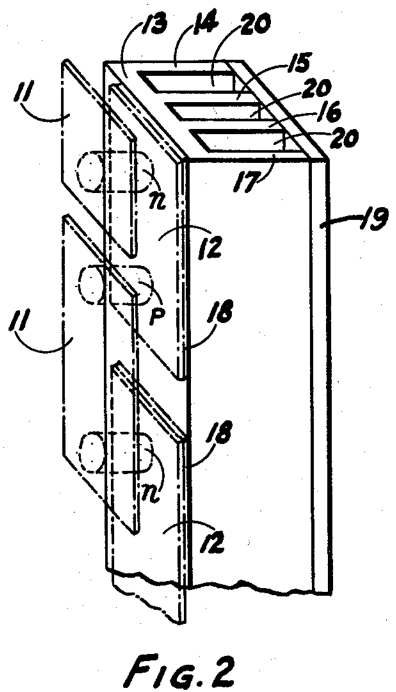

In the drawings:

FIG. 1 is a cross-sectional view, partially schematic, of a refrigerator system according to this invention, employing thermoelectric modules; and FIG. 2 is a perspective view, partially in phantom lines, of the uppermost portion of several of the elements illustrated at FIG. 1.

Referring now to FIG. 1 of the drawings, the numeral 10 denotes generally a thermoelectric assembly of conventional construction including a first plurality of conductors 11 lying in substantially the same plane, and a second plurality of conductors 12 lying in a second plane parallel to the first plane. Typical of present thermoelectric module constructions, a plurality of "N" and "P" semi-conductor billets are sandwiched between the alternating conductors 11 and 12. If desired, any suitable foam or other insulation may be placed around the "N" and "P" portions of the billets between the conductors 11 and 12. The elements so far described define a conventional thermoelectric assembly, the heat liberating side (assuming a certain direction of current therethrough) being defined by the plurality of conductors 11, while the heat abstracting side of the assembly is defined by the plurality of conductors 12. In order to enhance the efficiency of the assembly, the heat abstracting side may be provided with a basal member 13 (see FIG. 2) having a plurality of longitudinally extending and parallel fins 14, 15, 16 and 17. The basal member 13 and the fins are of a thermal conducting material and the surface of basal member 13 is electrically insulated from the plurality of conductors 12 against which it abuts. The conductors 12 and basal member 13 are in thermal contact by way of an electrically insulating but thermally conducting material 18, such as an aluminum oxide, thus effectively increasing the area of the heat abstracting portion of the thermoelectric assembly 10 by an amount proportional to the surface area of the fins.

As shown at FIG. 2 of the drawings, the ends of the fins 14 through 17 are provided with a closure member 19, thereby defining a plurality of passageways 20 between the fins. A fan or blower 21 is positioned adjacent the top of the basal member 13 the intake of which communicates with passageways 20. The blower 21 draws the fluid up through the passageways 20 and out through the blower in the direction of the arrow.

In order to absorb the heat from the thermoelectric modules, a block or heat sink 22 is placed in heat-exchange relationship with the plurality of heat liberating conductors 11 and a suitable coolant fluid internally circulated through the former through passageways 23 therein. Walls 24, only portions of which are illustrated, define the refrigerated atmosphere or enclosure, the basal member 13 and blower 21 lying within the refrigerated enclosure and the heat sink 22 being generally coincident with the walls 24 or lying therein.

A receptacle 25 of good thermal conductivity is placed below the lower end of the module and its adjacent basal member 13. The opening of the receptacle 25 faces the basal member 13. Receptacle 25 is provided with an integral portion 26 which is placed in heat-exchange relationship with the sink 22 adjacent the heat liberating side of the thermoelectric assembly 10. The portion 26 may be soldered, bolted, or otherwise placed in thermal communication with sink 22. A suitable passageway 27 functions as a drain communicating with the exterior of the refrigerator through wall 24. The lower portion of the receptacle 25 may be insulated thermally from the effects of low temperature within the refrigerator as by insulation 28.

In operation, unidirectional current is passed through the assembly 10. The heat abstracting conductors 12, by virtue of their thermal contact with basal member 13, lower the temperature of the fins 14 through 17. The operation of the blower 21 causes the fluid, here air, within the refrigerated enclosure to pass in through the bottom of the passageways 20 defined by the fins and closure element 19 and thence upwardly to the blower. Upon contacting the interior surfaces of the passageways, at least some of the moisture of the air within the refrigerated enclosure will condense and freeze on the surfaces thereof. Accumulation of frost on fins 14 through 17 is sensed by any of several well known methods (not shown) such as an air switch responding to reduced air flow, and such sensing initiates a defrosting action. Defrosting may preferably be accomplshed by terminating the unidirectional current through the thermoelectric module and to blower 21 and substituting an alternating current of suitable voltage to the modules to generate the desired degree of heating in the fins, as shown in the copending application of Walter E. Breneman, Serial No. 154,556. Alternately it might suffice merely to completely discontinue the flow of current to the modules, stop blower 21 and allow heat from the sink 22 to be conducted through the modules to basal plate 13 and fins 14 through 17 to melt the frost. Under the action of gravity, the moisture will fall downwardly into receptacle 25. Due to the thermal connection of integral portion 26 between receptacle 25 and a portion of the heat liberating side of the thermoelectric assembly, the condensate falling within receptacle 25 will remain in the liquid state and immediately pass out of the refrigerator through passageway 27.

It will also be apparent that sink 22 is always warm even during the cooling operation and in continued heat-exchange relation with receptacle 25 by way of integral portion 26, insuring that during operation receptacle 25 will always be maintained at an elevated temperature. Therefore ice or frost accumulating in receptacle 25 for any reason during operation will be melted and drain away via passageway 27.

I wish it to be understood that my invention is not to be limited to the specific constructions and arrangements shown and described, except only insofar as the claim may be so limited, as it will be apparent to those skilled in the art that changes may be made without departing from the principles of the invention.

I claim:

Refrigerating means comprising: an enclosure; thermoelectric means having a plurality of heat-extracting junctions and a plurality of heat-liberating junctions; a heat sink member, said heat-extracting junctions being in heat absorbing relationship with the interior of the enclosure and said heat-liberating junctions being in heat absorbing relationship with the heat sink member; a condensate receiving receptacle positioned within said enclosure and beneath said thermoelectric means; thermal conducting means connecting said receptacle and said heat sink means; means for circulating a coolant fluid from without said enclosure through said heat sink member; means for draining said condensate from said receptacle to prevent re-evaporation within said enclosure; and means insulating said condensate drain means.

References Cited by the Examiner

UNITED STATES PATENTS

| | | | |
|---|---|---|---|
| 1,861,875 | 6/32 | Percival | 62—286 |
| 2,090,416 | 8/37 | Hull | 62—279 |
| 2,315,222 | 3/43 | Philipp | 62—279 |
| 2,362,729 | 11/44 | Smith | 62—279 |
| 2,626,509 | 1/53 | Morrison | 62—279 |
| 2,944,404 | 7/60 | Fritts | 62—3 |
| 2,955,439 | 10/60 | Pinter | 62—291 |
| 2,970,449 | 2/61 | Eichhorn | 62—3 |
| 3,040,539 | 6/62 | Gaugler | 62—3 |
| 3,103,797 | 9/63 | Harley | 62—289 |

FOREIGN PATENTS

| | | |
|---|---|---|
| 1,101,456 | 3/61 | Germany. |
| 76,581 | 12/54 | Holland. |

ROBERT A. O'LEARY, *Primary Examiner.*

WILLIAM J. WYE, *Examiner.*